United States Patent
Fichtner et al.

(10) Patent No.: US 6,360,362 B1
(45) Date of Patent: Mar. 19, 2002

(54) AUTOMATIC UPDATE OF CAMERA FIRMWARE

(75) Inventors: Mark R. Fichtner; Mannan A. Mohammed, both of Chandler; Dennis R. Kush, Tempe; Edward P. Tomaszewski, Phoenix, all of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/026,862

(22) Filed: Feb. 20, 1998

(51) Int. Cl.⁷ .............................................. G06F 9/445
(52) U.S. Cl. .................................... 717/11; 713/100
(58) Field of Search ........................ 395/712; 348/231; 711/202; 717/11; 375/222; 713/1, 2, 100; 703/20; 709/228; 455/419; 710/8–14, 62–74

(56) References Cited

U.S. PATENT DOCUMENTS

| | | | |
|---|---|---|---|
| 4,924,513 A | * 5/1990 | Herbison et al. ............. 380/21 |
| 5,138,459 A | * 8/1992 | Roberts et al. ............. 348/232 |
| 5,226,145 A | * 7/1993 | Moronaga et al. .......... 711/202 |
| 5,262,868 A | * 11/1993 | Kaneko et al. ............. 348/233 |
| 5,268,928 A | * 12/1993 | Herh et al. ................. 375/222 |
| 5,477,264 A | * 12/1995 | Sarbadhikari et al. ...... 348/231 |
| 5,566,335 A | * 10/1996 | Nash et al. ..................... 713/1 |
| 5,623,604 A | * 4/1997 | Russell et al. ................. 717/11 |
| 5,696,899 A | * 12/1997 | Kalwitz ....................... 709/228 |
| 5,701,492 A | * 12/1997 | Wadsworth et al. .......... 717/11 |
| 5,737,585 A | * 4/1998 | Kaneshima ................... 703/20 |
| 5,790,260 A | * 8/1998 | Myers ........................ 358/296 |
| 5,822,692 A | * 10/1998 | Krishan et al. ............. 455/419 |
| 5,878,256 A | * 3/1999 | Bealkowski et al. ........... 713/2 |
| 6,115,799 A | * 9/2000 | Ogawa ....................... 711/171 |

OTHER PUBLICATIONS

PCT Search Report, International Application No. PCT/US99/01398, Jan. 22, 1999, 4 pgs.

* cited by examiner

Primary Examiner—Mark R. Powell
Assistant Examiner—Hoang-Vu Antony Nguyen-Ba
(74) Attorney, Agent, or Firm—Benjamin Burge (57) ABSTRACT

A method of updating firmware between an imaging device and a host system is disclosed. The host system detects that the firmware on the imaging device is incompatible with a configuration of the host system. In response to detecting the incompatibility, an updated firmware image is transferred from the host system to the imaging device.

32 Claims, 10 Drawing Sheets

| OPERATING SYSTEM | HOST APPLICATION S/W | CAMERA API |
|---|---|---|
| Open Host Application S/W → | Create and Initialize CameraAPI →<br>→<br>→<br>→<br><br>Add main window to CameraAPI's callback list | Reset internal variables<br>Load DLLs<br>Create & start backgrd thread<br>Insert a CM_SIGNAL_STATUS message into backgrd-threaded queue |

FIG. 4

| CAMERA API | | HOST APPLICATION SOFTWARE |
|---|---|---|
| CM_SIGNAL_STATUS<br>If Camera is not Open<br>  If OpenDriver() succeeds<br>    Close Driver()<br>    If message has not been sent before<br>      Signal all callback windows | → | WM_CAMERAAPI_STATUS<br>If Message is CM_IS_CONNECTED<br>  OpenDriver() |
| CM_OPEN_DRIVER<br>Open camera driver<br>Check for compatible camera | ← | |
| CM_GET_NO_OF_IMAGES<br>Returns number of images on camera | ← | Get number of images |
| CM_GET_IMAGE_LIST<br>Returns list of image names and sizes | ← | If number of images > 0<br>  Get Image List |
| CM_GET_IMAGE_BY_NAME<br>Returns image with given name | ← | Download images, one-by-one |

AUTOMATIC UPDATE OF CAMERA FIRMWARE

FIELD OF THE INVENTION

The present invention relates to the field of imaging. More particularly, this invention relates to updating firmware between an imaging device and a host system.

BACKGROUND OF THE INVENTION

Imaging devices, such as cameras, typically store still or moving (video) image information on film, video tape, or other media. Digital cameras capture image information in digital format and store the image information in memory, such as a flash memory, or on other digital storage media. The digital image information can be downloaded to a host system, such as a personal computer. The image information can then be manipulated by rotating the image, cropping the image, or otherwise altering the image with software applications residing on the host system.

The imaging device includes firmware that allows the imaging device to communicate with software on the host system. The firmware includes instructions for performing various functions. For example, the firmware may be used to determine the exposure of an image, sense color in a particular manner, compress image data, conserve power, perform self tests, and/or specify accessing and formatting protocols to the storage medium on the camera.

Oftentimes, it is desirable to upgrade either the host software and/or the camera firmware with a new release of software or firmware. A common method for upgrading software is through the use of a patch, or service pack upgrade. This method consists of distributing a set of programs via floppy disk, CD-ROM, or World Wide Web to the host machine. The service pack, when run, modifies the components of the host software that need updating.

Updating the firmware is more problematic. This process is typically performed manually by a user. It may involve running an executable program, then resetting the imaging device. Manual updating of the firmware is inconvenient, and may lead to errors caused by incompatible versions of firmware and host system software.

SUMMARY OF THE PRESENT INVENTION

A method of updating firmware on an imaging device coupled to a host system is disclosed. The host system detects that the firmware on the imaging device is incompatible with a configuration of the host system. In response to detecting the incompatibility, an updated firmware image is transferred from the host system to the imaging device. In one embodiment, the updated firmware image is an older version of firmware than the one that is replaced.

Other features, and advantages of the present invention will be apparent from the accompanying drawings and from the detailed description that follows below.

DETAILED DESCRIPTION

A method of updating firmware between an imaging device and a host system is disclosed. The firmware includes instructions which are used to control an embedded system, such as an imaging device. In one embodiment, the firmware update is performed automatically upon connecting the imaging device to the host system. This simplifies operation for the user while ensuring compatibility between the imaging device and the host software. The firmware update may provide "bug" fixes, enhancements to algorithms, updated color sensing, updated compression, new protocols for accessing and formatting the storage medium, and so forth. As will become clear, the automatic firmware update is particularly useful when multiple a imaging devices with different versions of firmware are used with host systems that have different versions of software.

The following description describes the firmware update in the context of a system that transfers image information between the image device and the host system automatically upon coupling the image device to the host system. However, the firmware update is not limited to such a system.

The imaging device may be an image capture device, such as a camera. Alternatively, the techniques disclosed can be used with any device that is capable of storing image information. The host system may be any system which is capable of manipulating image information. For example, the host system may be a personal computer such as an IBM-compatible personal computer running on an Intel Pentium® or Pentium® II processor. However, the host system could alternatively be a printer, plotter, fax machine, display device, or storage device.

For purposes of clarity, the following description is written in terms of the imaging capture device being a camera and the host system being a computer. It should be understood that other imaging devices and host systems may be employed.

Figure 1:
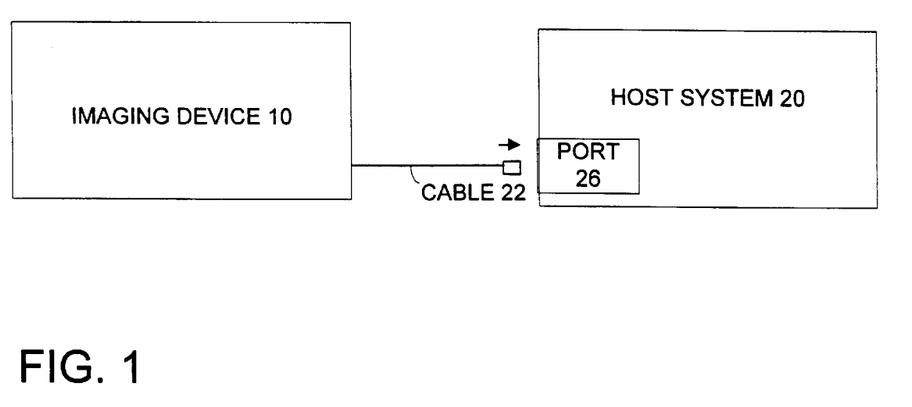
FIG. 1 shows a representation of an imaging device that is attachable to a host system.

FIG. 1 shows a representation of an imaging device 10 that is attachable to a host system 20. In one embodiment, the imaging device 10 is attached via a cable 22 to a port 26 of the host system 20. The imaging device 10 is preferably coupled to the host system 20 using a data transfer protocol that supports a high data transfer rate. In one embodiment, the imaging device 10 is coupled to the host system 20 via a Universal Serial Bus (USB) connection. The USB connection provides for a data transfer rate of up to 12 Mb/s. Other connections and data transfer protocols may alternatively be used, such as the 1394 protocol. (More information on USB can be obtained from the World Wide Web at the URL http://www.usb.org/. The 1394 standard is maintained and distributed by the Institute of Electrical and Electronic Engineers. Firewire, one implementation of 1394, is defined by IEEE Standard 1394–1995.)

Figure 2:
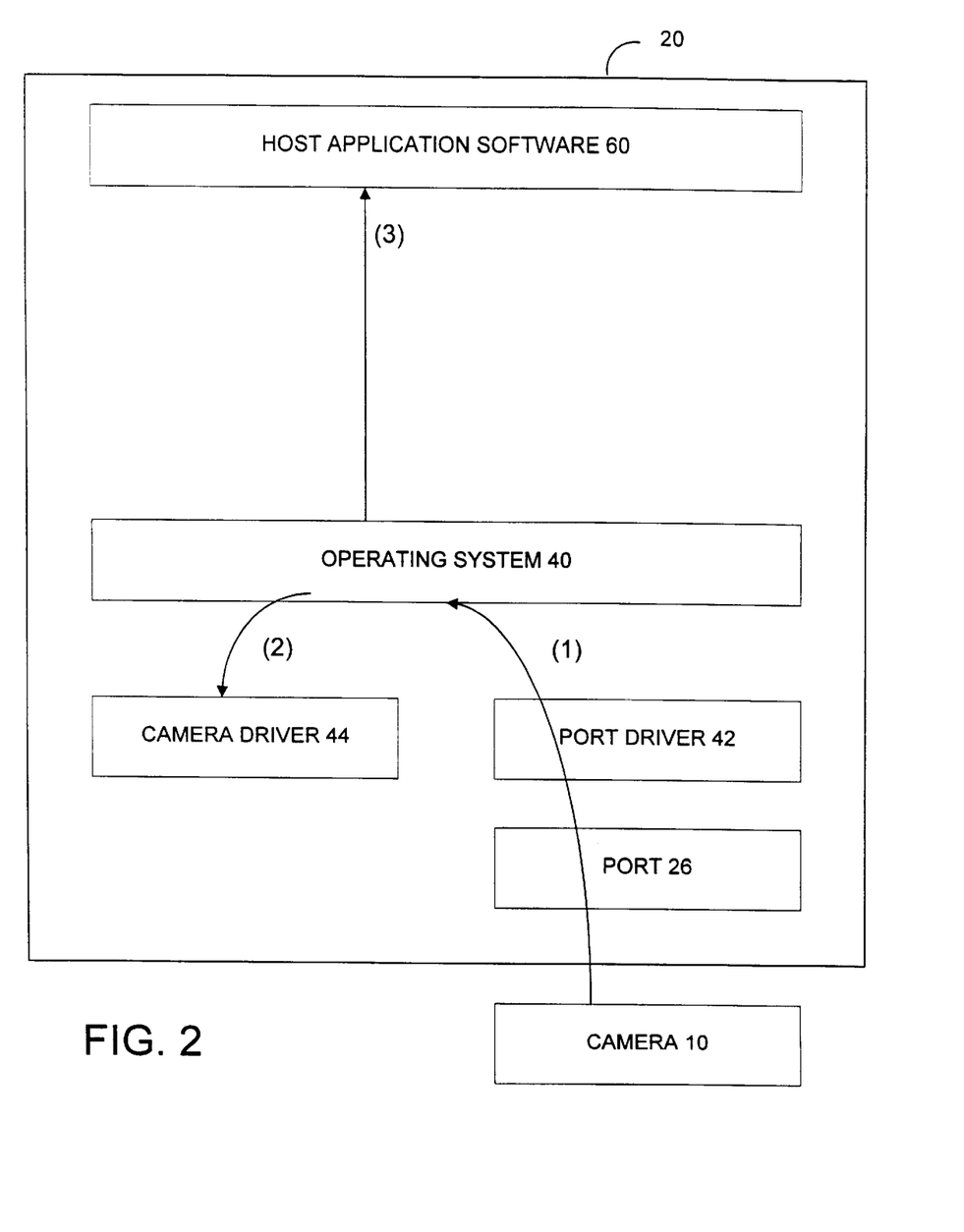
FIG. 2 shows one embodiment of the flow of information among the components of the host system when the imaging device 10 is first connected to the host system 20.
Figure 3:
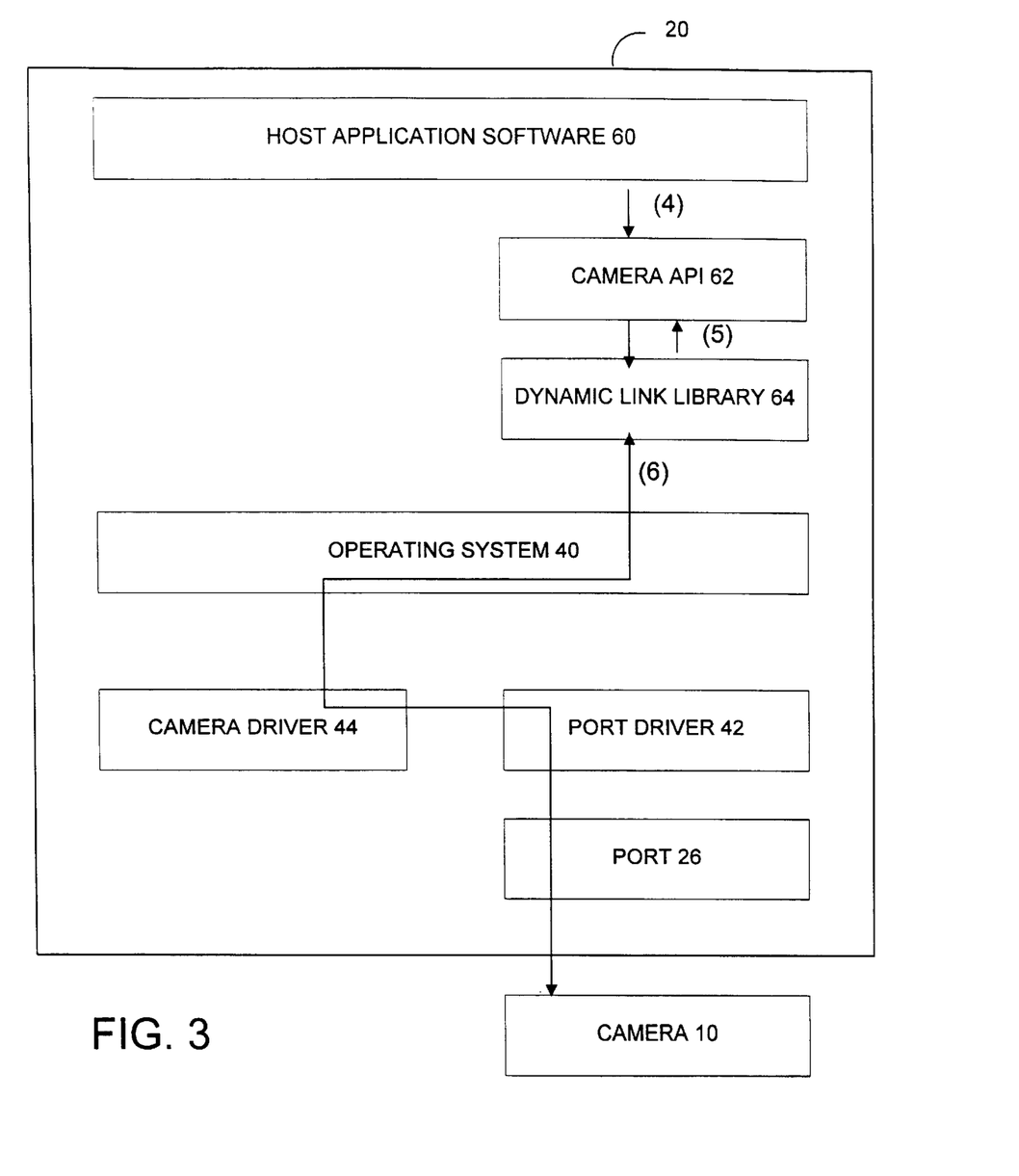
FIG. 3 shows one embodiment of the flow of information among the components of the host system after the host application software 60 has been initiated.

FIGS. 2 and 3 are embodiments showing the relationship and messaging between components of the host system 20 and imaging device (camera) 10. FIG. 2 shows one embodiment of the flow of information among the components of the host system when the imaging device 10 is first connected to the host system 20. The host system 20 includes an operating system (O/S) 40 and host application software 60. The host system 20 detects when an imaging device such as a camera 10 is attached to the host system 20. In one embodiment, the operating system 40 detects whether a camera 10 is attached to the system by polling the port 26. A port driver 42 may be used to provide an interface between the operating system 40 and the port 26. In one embodiment, the port 26 is a USB port and the port driver is a USB driver.

The operating system may be one of a variety of different operating systems. In one embodiment, the operating system is a Windows* operating system, such as Windows* 95, or Windows* 98 made by Microsoft Corporation. Windows 98 includes hooks which allow the polling of ports. Other operating systems may be modified to provide for such polling. The polling is preferably performed in the background so that the user need not be aware that it is being performed. Alternatively, host application software 60 can perform the polling of the port 26. However, polling by the operating system 40 (instead of by host application software 60) has a performance advantage, since the operating system is already set up for polling various activities, such as keyboard pushes, mouse movements, and so forth. For the purposes of illustration, the following description assumes that the operating system does the polling. A person skilled in the art can make the modifications to allow an application to do the polling.

* Third-party marks and brands are the property of their respective owners.

When a camera 10 is connected to the port 26 of the host system 20, the port driver 42 signals the operating system 40 that the camera has been attached to the host system 20. This is illustrated by the arrow marked (1) shown in FIG. 1. The operating system 40 identifies the device as a camera and loads the corresponding software driver 44 into memory as illustrated by the arrow (2). In one embodiment, the operating system 40 interrogates the camera 10 to get an identifier. The operating system 40 loads the software driver 44 corresponding to the identifier. In this example, a camera driver 44 is loaded by the operating system 40.

The operating system 40 then loads one or more software applications corresponding to the camera. In one embodiment, the operating system allows software applications to be registered. Upon meeting a predetermined condition (such as a camera with a particular identifier being detected), the registered host application software is loaded. In this case, the host application software 60 (for the camera) is loaded as shown by the arrow (3). In one embodiment, the camera driver 44 signals the operating system 40 to initiate the host application software 60. The host application software 60 initiates the transfer of image information between the image device (camera) 10 and the host system 20. The host application software 60 may also process images. For example, the host application software 60 can perform decompression and/or color correction on the images. Furthermore, the host application software 60 may perform rotation, cropping, and other image manipulation functions.

Some operating systems, such as Windows 98 allow specific events to cause software applications to be launched. For example, the camera driver 44 can be set up with registered events such as "connection detected with camera" or "shutter button on camera is pushed." Thus, an operating system can be set up to automatically launch an application such as the host application software 60 when the camera 10 is attached.

In one embodiment, if the camera driver 44 or the host application software 60 is not installed on the host system 20 when the camera 10 is attached to the host system 20, then the user is requested to provide the camera driver 44 and/or host application software 60 for the device that has been attached to the port 26. Once the installation has been completed, the process proceeds as previously described.

FIG. 3 shows one embodiment of the flow of information among the components of the host system after the host application software 60 has been initiated. In this embodiment, after being loaded, the host application software 60 creates and initializes a camera Applications Programming Interface (API) 62 as indicated by arrow (4). The camera API 62 may perform its task in a background thread. In this manner, the host application software 60 need not wait for the camera API 62 to complete before performing other tasks. In one embodiment, the camera API 62 is a COM object which loads a dynamic link library (DLL) 64 as shown by arrows (5). The DLL may be O/W dependent. The camera API 62 communicates to the operating system 40 via the DLL 64. (In another embodiment, the camera API 62 incorporates the DLL 64.) The operating system 40 in turn communicates with the camera 10 via the camera driver 44 and the port driver 42 as shown by arrows (6).

Figure 4:
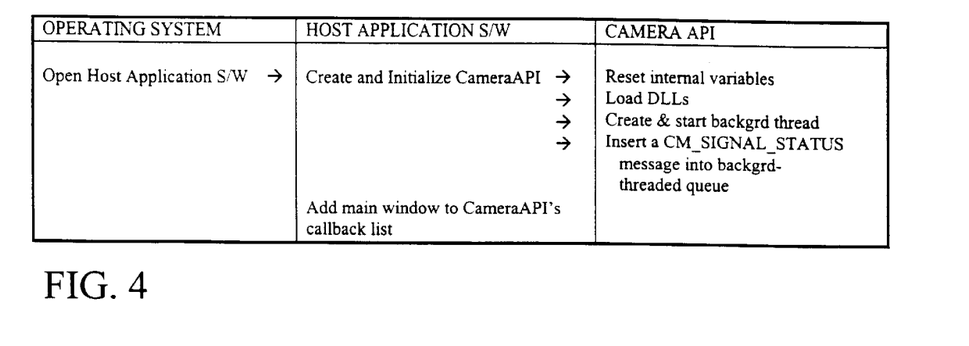
FIG. 4 shows one embodiment of the polling initialization process.

FIG. 4 shows one embodiment of the polling initialization process. The polling initialization process begins with the operating system opening the host application software. The host application software 60 then creates and initializes a camera API 62. In one embodiment, the host application software 60 adds itself to the camera API's callback list, so that the host application software 60 will be notified when the camera API is successful in the polling process.

In one embodiment, the camera API upon initialization resets its internal variables, loads a DLL, and creates and starts a background thread. The camera API then inserts a message into the background threaded queue that tries to open the camera driver. (A driver is "opened" by establishing a connection between the camera API and the driver.) In one embodiment, the camera driver is only opened when a camera is attached: If the camera driver cannot be opened, then a camera is not attached to the host system. If a camera driver can be opened, then a camera is attached. In one embodiment, the camera API 44 attempts to open the camera driver every half a second.

Figure 5:
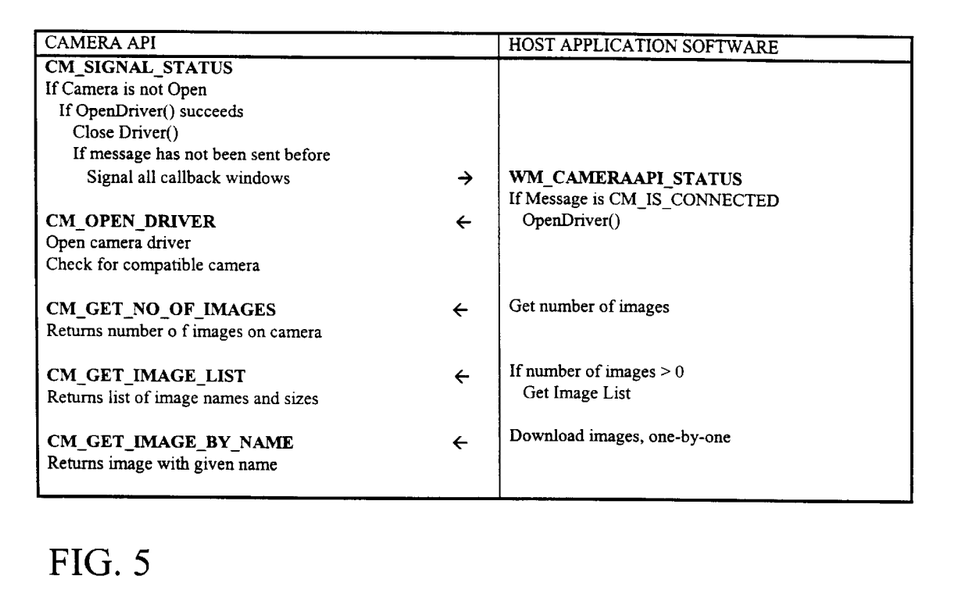
FIG. 5 shows an embodiment of the polling process between the camera API 62 and the host applications software 60.

FIG. 5 shows an embodiment of the polling process between the camera API 62 and the host application software 60. In this embodiment, the camera API 62 attempts to open the camera driver (CM_SIGNAL_STATUS). When it is successful at opening the camera driver, the camera API closes the camera driver, and notifies the applications in its callback queue. Since the host application software 60 is in the callback queue of the camera API, it is notified that a camera has been detected.

In this embodiment, the host application software 60 re-opens the camera driver 44 by signaling the camera API 62 to open the camera driver 44 and check for a compatible camera (CM_OPEN_DRIVER). The host application software 60 can then send various commands to the camera 10 via the camera API 62 (and the operating system 40 and drivers 44 and 42). For example, the host application software 60 can request the number of images stored in the camera (CM_GET_NO_OF_IMAGES). The host application software 60 can request a list of the names of the images and the image sizes (CM_GET_IMAGE_LIST), or it can request a particular image (CM_GET_IMAGE_BY_NAME).

In one embodiment, the camera API 62 checks whether a compatible imaging device is connected to the host system, and automatically updates the firmware on the imaging device, if necessary. The automatic firmware update may be disabled or enabled as a factory setting by the manufacturer, or it may be alterable by the user.

Figure 6:
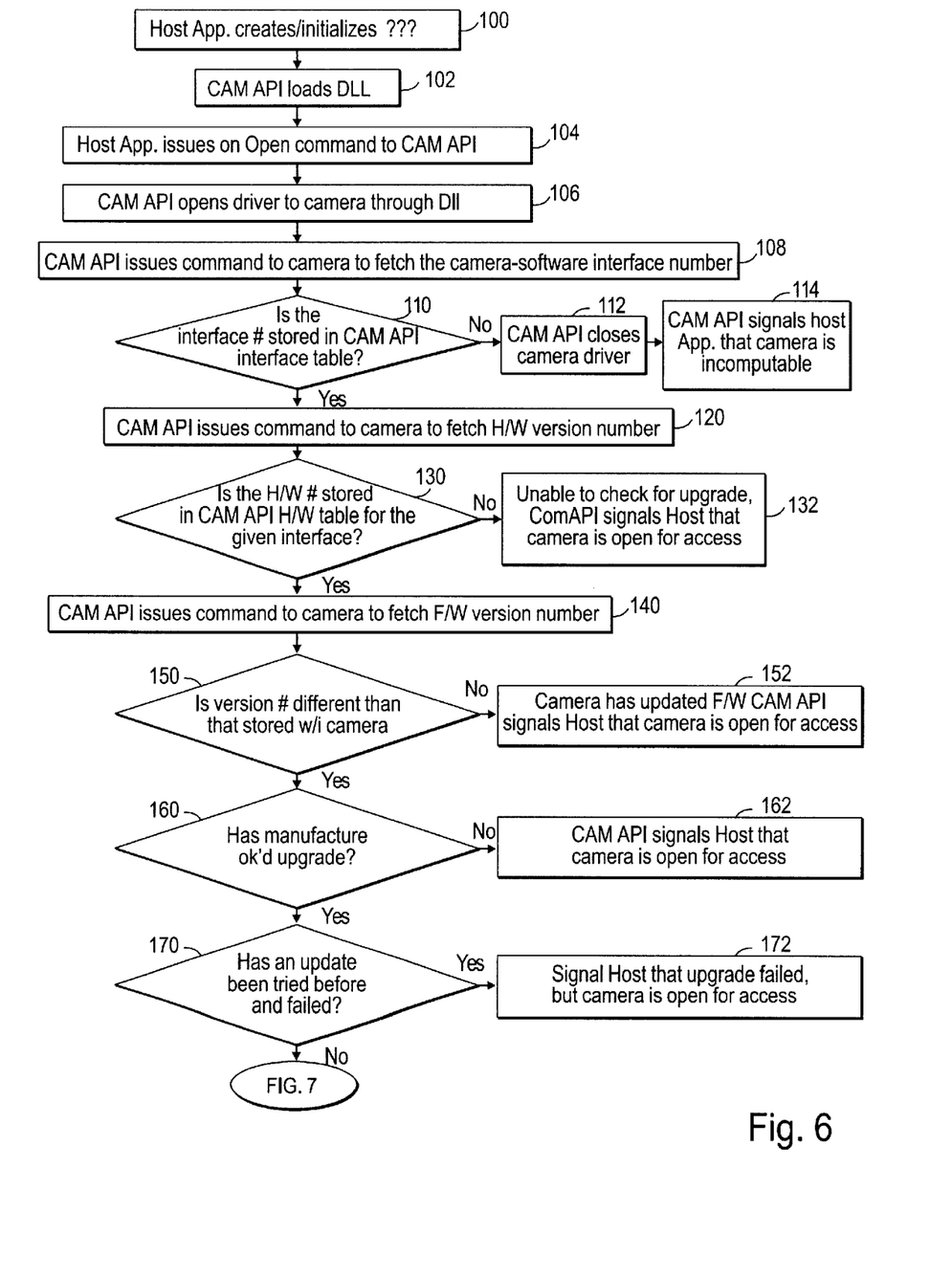
FIG. 6 shows a flowchart of one embodiment of the process of checking whether a compatible imaging device is connected to the host system.

FIG. 6 shows a flowchart of one embodiment of the process of checking whether a compatible imaging device is connected to the host system. In one embodiment, this process is performed by the camera API 62. As previously mentioned, the camera API 62 is created and initialized by the host application software 60 as shown at block 100. The camera API 62 loads a DLL that may be operating system dependent at block 102, and the host application software 60 issues an open command to the camera API 62 at block 104. The camera API in response, opens the camera driver 62 via the DLL 64, as shown in block 106.

At block 108, the camera API 62 issues a command to the camera to fetch the camera interface number. In one embodiment, a unique camera interface number is assigned to a set of commands that the camera supports.

Operation continues at decision block 110. The interface number from the camera is compared with an interface table in the camera API 62. If the interface number is not stored in the camera API 62 interface table, then the camera API 62 closes the camera driver and signals to the host application software that the camera is incompatible, as shown at blocks 112 and 114. The camera API is not able to communicate with the camera because the commands that the camera supports is not known.

At block 110, if the interface number from the camera is stored in the interface table of the camera API 62, then the camera API 62 issues a command to the camera to fetch a hardware version number, as shown at block 120.

At block 130, the hardware version number from the camera is compared with a hardware table stored in the camera API 62. If the hardware version number from the camera is not stored in the hardware table of the camera API 62, then the camera API 62 is unable to check for an update. The camera API 62 signals the host application software that the camera is open for access, as shown at block 132. The camera API 62 is able to communicate with the camera because its interface is compatible, but it does not update the firmware because it does not recognize the hardware configuration.

At block 130, if the hardware version number from the camera is stored in the hardware table of the camera API 62, then operation proceeds to block 140. At block 140, the camera API issues a command to the camera to return the firmware version number.

Operation proceeds to block 150. If the firmware version number is not different than that stored within the camera API 62, then the camera has updated firmware already. The camera API 62 signals the host application software that the camera is open for access.

If the firmware version number is different than that stored in the camera API 62, then operation continues at block 160.

If the manufacturer has disabled the firmware updates, then the camera API 62 does not perform a firmware update and signals the host application software that the camera is open for access. For example, the manufacturer may set a bit in a register of the camera disabling firmware updates. Although the installed firmware may not be the latest version, the installed firmware is still able to perform with the host software as long as the interface and hardware are compatible.

At block 170, a check is made whether the update has been tried before and failed. In one embodiment, a predetermined number of update tries is performed. If the update has been tried before and failed, then the camera API 62 signals to the host application software that the upgrade failed, and that the camera is open for access, as shown at block 172.

Figure 7:
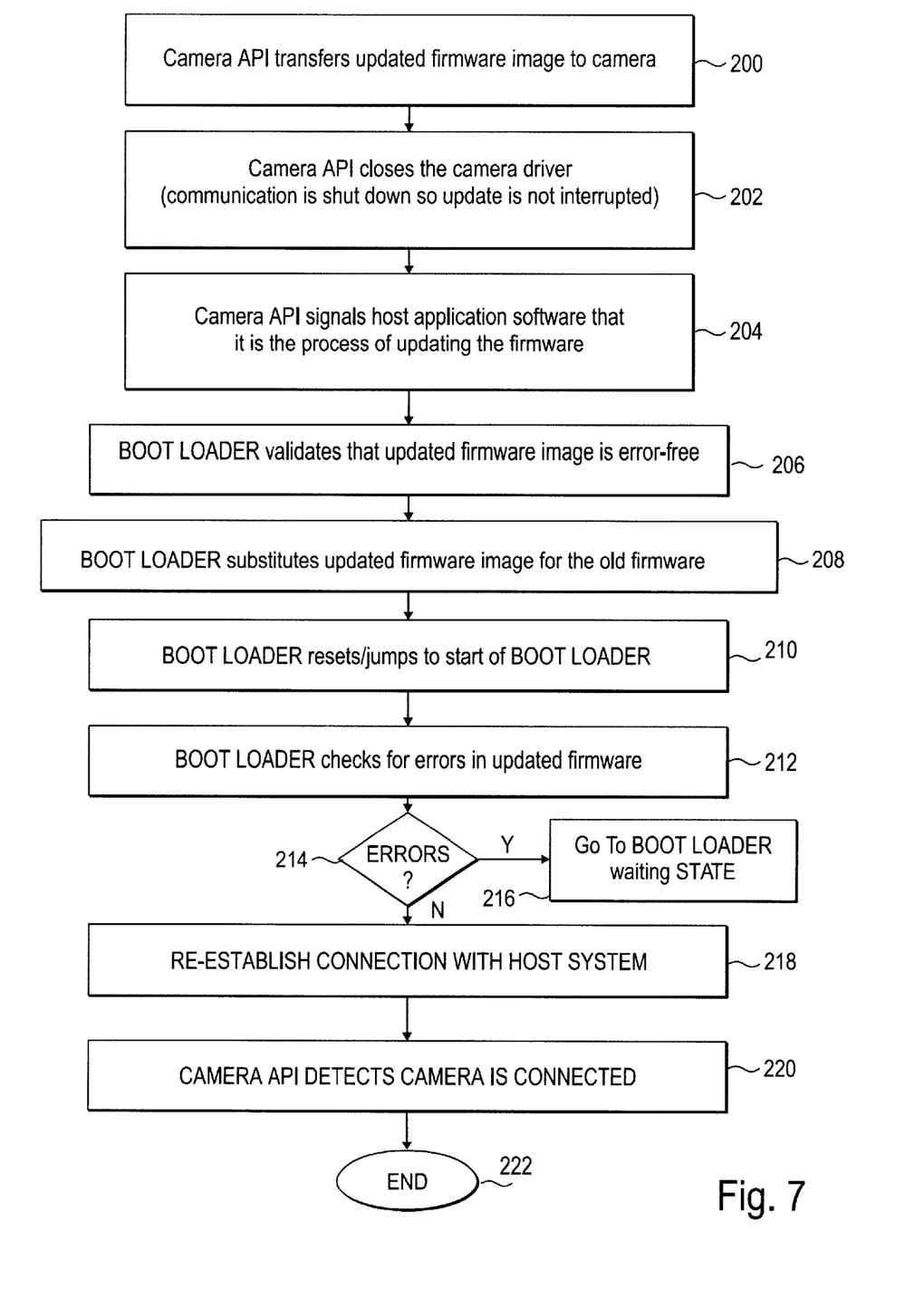
FIG. 7 shows a flowchart of one embodiment of updating the firmware.

At block 170, if the update has not been tried before, then the flowchart proceeds with the firmware update process, as shown in FIG. 7.

FIG. 7 shows a flowchart of one embodiment of updating the firmware. At block 200, the camera API transfers an updated firmware image to the camera. In one embodiment, the camera API sends a download firmware command to the camera, so that the firmware will be ready to receive a new firmware image. The updated firmware image is then transferred from the host system to the camera. In one embodiment, the updated firmware image is stored on the camera in a temporary buffer, such as volatile memory.

At block 202, the camera API 62 closes the camera driver. This shuts down communication between the camera and the host system so that the firmware update is not interrupted. The camera API then signals the host application software that it is in the process of updating the firmware, as shown at block 204. The camera API begins to poll for the firmware to re-establish a connection with it.

The firmware is made up of a boot block and a code block. The boot block, also called the bootloader, is not replaced when the firmware is replaced. Only the code block is replaced. The bootloader maintains the routine for updating the firmware. At block 206, the bootloader validates that the updated firmware image is error free. This can be performed by generating a checksum, for example. The bootloader then substitutes the updated firmware image for the old (installed) firmware, as shown at block 208. In one embodiment, this is performed by transferring the firmware image from volatile memory into nonvolatile memory. The bootloader then either causes a reset, or it jumps to the start of the bootloader to initiate the newly updated firmware, as shown at block 210. This causes the bootloader to restart, at which point the bootloader checks for errors in the updated firmware, as shown at block 212. If the checksum is correct, then the firmware in the code block is executed, as shown at block 214 and 218.

If the checksum is incorrect, the bootloader re-establishes a connection with the host system and moves to a waiting state, as shown at block 216. In this waiting state, the camera API may get status from the bootloader to determine whether the new firmware image was loaded properly into the code block, or whether there was a problem, and the bootloader is in the waiting state. The camera API may attempt another update of the firmware.

Proceeding from block 218, once the firmware is able to restart with a correct checksum on its code block, then the firmware can establish a connection with the host system. The camera API will detect from its polling that the camera is connected at block 220. The camera API can then re-open the camera driver and perform accesses to the camera.

Figure 8:
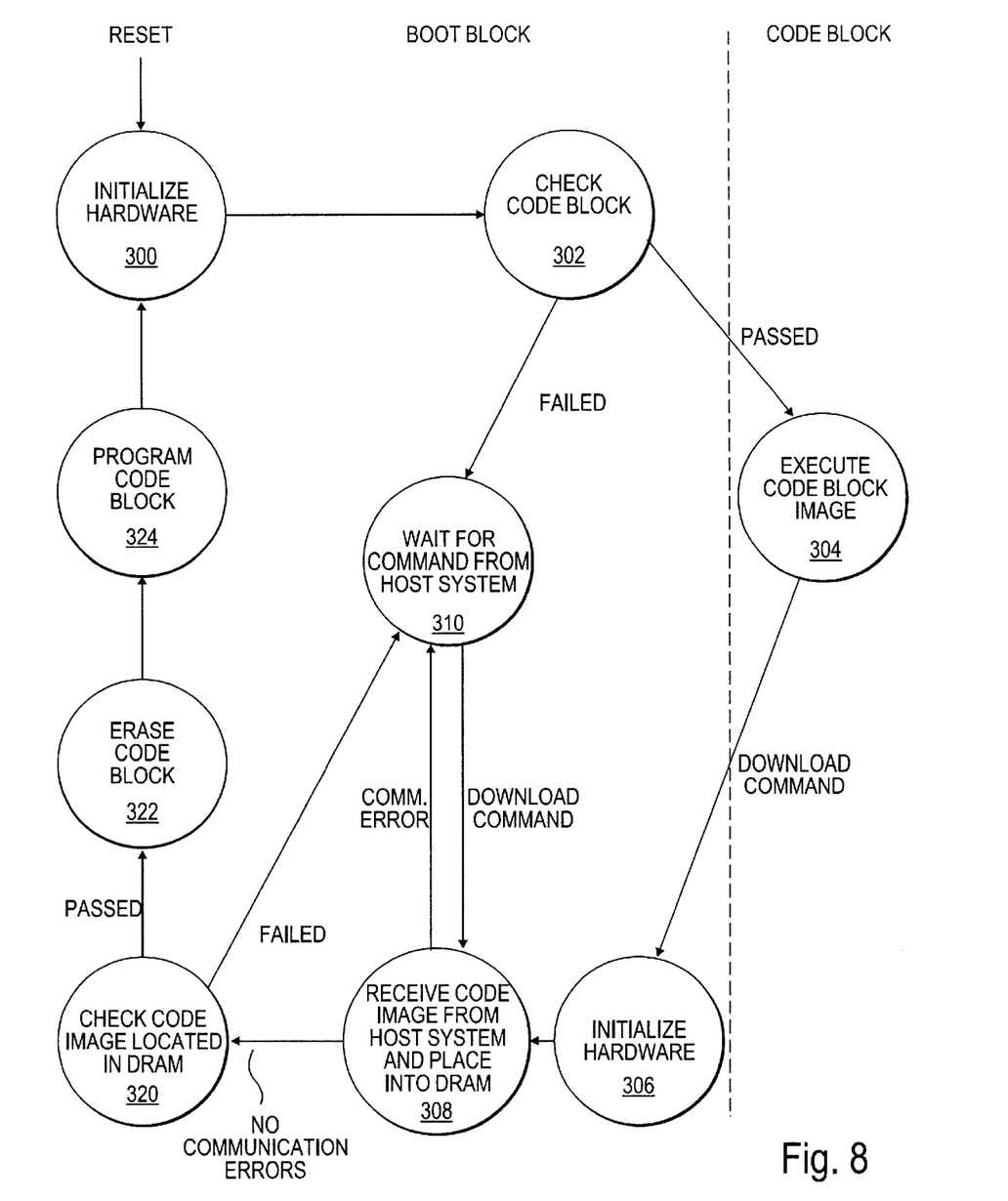
FIG. 8 shows one embodiment of a state transition diagram of the firmware boot process.

FIG. 8 shows one embodiment of a state transition diagram of the firmware boot process. The state transition diagram is divided into boot block states on the left hand side of the FIG. 8 and a code block state on the right hand side of FIG. 8. At state 300, a reset initializes the camera hardware. This may include resetting registers and/or turning off certain units of the camera, so that the camera is in a known state. From state 300, there is a transition to state 302, at which the code block is checked. In one embodiment, a checksum is performed on the code block. If the checksum passes, then the instructions in the code block are executed, as shown at state 304. The firmware in the code block is able to establish a connection with the host system and handles various commands received from the host system. If the firmware in the code block detects that the host system has issued a download command, then the state transitions to state 306, at which the camera hardware is initialized into a known state. For example, the sensor and strobe may be turned off, and the DRAM may be turned on. In one embodiment, the camera hardware is turned off when not in use in order to save power. The state transitions to block 308, at which the updated firmware code is received from the host system. The updated firmware code is temporarily stored in DRAM in one embodiment If there is a communication problem at state 308, then there is a transition to waiting state 310. At waiting state 310, the boot block waits for a command from the host system.

From state 302, if the checksum fails, then there is also a transition to waiting state 310. At waiting state 310, the boot block waits for a command from the host system. The host system, for example, may request status information from the boot block. When the host system realizes that the boot block is in waiting state 310, the host system can issue another download command, which results in a transition back to state 308.

From state 308, if the firmware image is downloaded without errors, then there is a transition to state 320, at which the code that was downloaded is checked for errors. In one embodiment a checksum is performed. If the checksum fails, then the boot block returns to waiting state 310. If the checksum passes, then the state transitions to block 322, at which the code block is erased. Subsequently, the code block is re-programmed in state 324. From state 324, there is a transition back to state 300 at which the camera hardware is re-initialized and the state transition diagram restarts as previously described.

Figure 9:
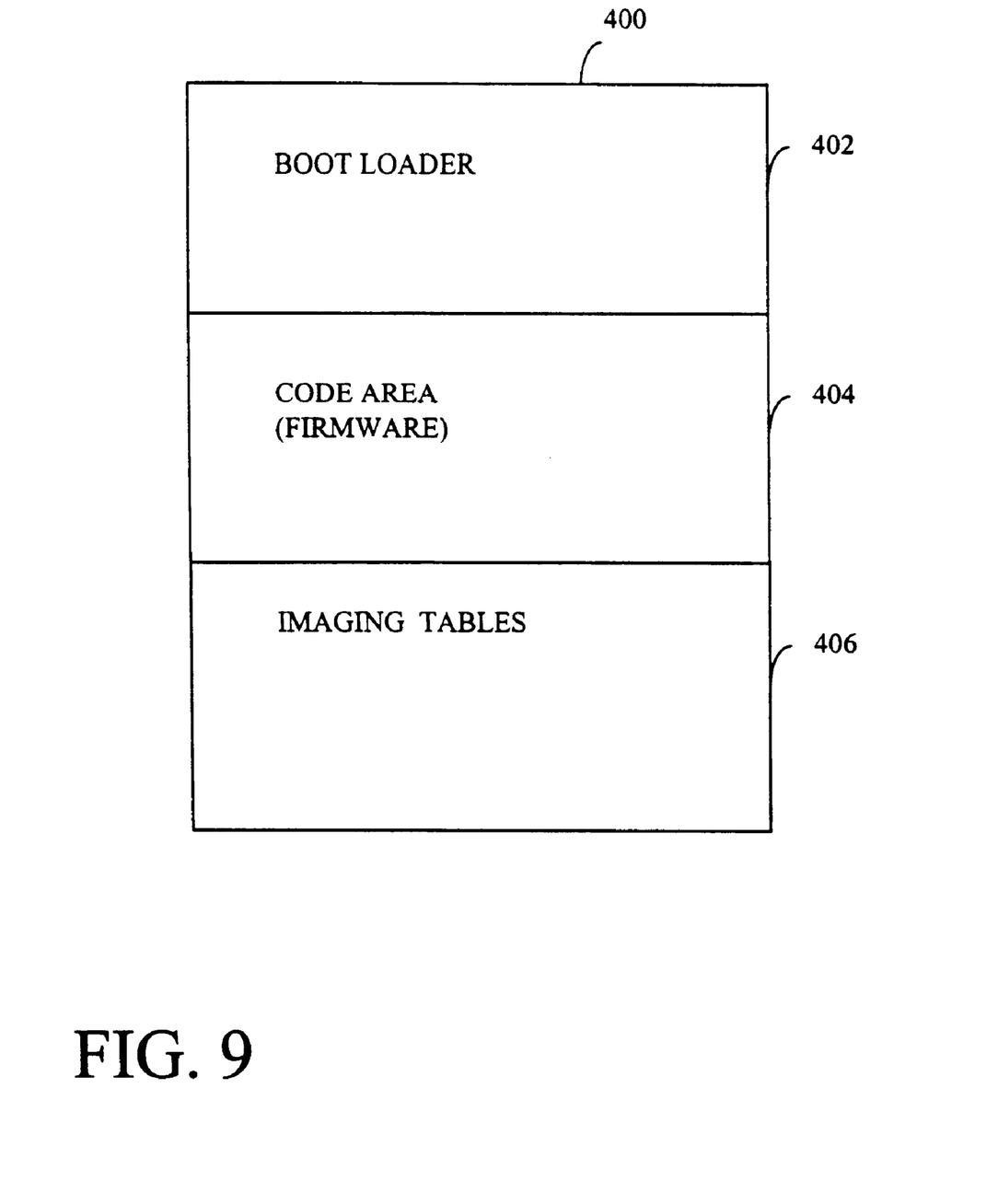
FIG. 9 shows a diagram of an exemplary nonvolatile memory 400 which stores the firmware.

FIG. 9 shows a diagram of an exemplary nonvolatile memory 400. In one embodiment, the nonvolatile memory is a flash memory. In one embodiment, the boot block 402 and code block 404 are stored in the flash memory, and the boot block is locked so that it is not overwritten. The code block is re-programmable.

In one embodiment, the nonvolatile memory also stores one or more imaging tables 406. The imaging tables may include information associated with the configuration of the camera.

In one embodiment, the following imaging tables are stored in the flash memory.

1) dead pixel table
2) encoder table
3) exposure table
4) compander table
5) color correction tables The imaging tables allow for processing of an image in the camera. For example, the dead pixel table may include information on particular pixels of the camera which do not work properly. The dead pixel table may be determined during manufacturing testing, for example. Alternatively, a camera may be able to determine dead pixels dynamically. The dead pixel table allows for interpolation using neighboring pixels to compensate for the defective pixels.

Similarly, the other imaging tables allow manipulation of imaging data. For example, the encoder table may specify particular values used for encoding or compressing an image. Exposure tables may include information on exposure time, gain, strobe use and intensity. The companding table may include information used to map data from a bit representation using a first number of bits to a bit representation using a smaller number of bits. The color correction tables may be used to correct colors.

In one embodiment, the imaging tables include values that are associated with a particular illuminant. For example, the imaging tables may include different values corresponding to the capture of an image in either sunlight, fluorescent lighting, or tungsten bulb lighting.

The imaging tables may be stored into the nonvolatile memory 400 during manufacturing, but may be updated later by the firmware. In one embodiment, the firmware is able to delete imaging tables in the nonvolatile memory and transfer new imaging tables from the host system to the nonvolatile memory of the camera. The firmware receives commands from the host system which indicates whether a table is to be transferred to the camera, or whether an imaging table is to be deleted.

In one embodiment, because some nonvolatile memories (e.g., some flash memories) are not able to both read from the nonvolatile memory and write to the nonvolatile memory at the same time, a DRAM is used to temporarily store code from the nonvolatile memory. The firmware copies a portion of its code to the DRAM, then transfers execution to the DRAM. A microcontrolller executing instructions out of the DRAM is able to then write the new imaging tables to the nonvolatile memory. Execution is subsequently transferred back to the code section of the nonvolatile memory.

Tables 1 and 2 are used to show examples of how various versions of interfaces, firmware, and camera APIs on different cameras and personal computers (PCs) may interrelate. Table 1 indicates a configuration table stored in a first camera API (CAMAPI #400). Table 2 indicates a configuration table stored in a second camera API (CAMAPI #420). Some examples of various embodiments using the configuration information stored in these tables will help to illustrate.

TABLE 1

| Interface Identifier | Hardware Version | Firmware Version/ Firmware Image |
| --- | --- | --- |
| 0x0101 | 1.00 | 1.00/Filename 3 |
| | 1.01 | 1.02/Filename 4 |
| | 1.02 | 1.07/Filename 5 |
| 0x0202 | 2.00 | 1.08/Filename 6 |

TABLE 2

| Interface Identifier | Hardware Version | Firmware Version |
| --- | --- | --- |
| 0x0303 | 3.00 | 1.09/Filename 8 |
| | 3.01 | 1.09 Filename 8 |
| | 3.02 | 2.18 Filename 12 |
| 0x0404 | 4.00 | 3.08 Filename 13 |

Example 1: Assume that two users, A and B, have the same version of host application software and firmware versions. Let the software version be 1.0 which creates CAMAPI #400 having the table of identifiers shown in Table 1. The interface identifier is 0x0101, and the firmware version is 1.00. Next, user A receives an upgrade and updates his host application software to version 1.02, which has the same interface (0x0101).

After the host application software is upgraded, the first time that user A tries to access the camera, the camera API 62 will detect an incompatible version of firmware. It will trigger the firmware to be updated automatically, as was previously described.

Subsequently, assume that user B (who still has firmware version 1.00 on his camera) brings his camera to A's PC and plugs it in. The camera API on A's PC will again detect the firmware and software versions. The camera API will update the firmware on B's camera to 1.02. B's camera will now have a different firmware (1.02) than the host software on B's PC. When B takes his camera back to B's PC, the camera API 62 will have no knowledge of the firmware version 1.02. The camera API 62 will transfer the firmware image version 1.00 to B's camera. Thus, B's camera is restored to its original firmware so that it can communicate with the software on B's PC.

The firmware update is transparent to B. B is able to use his camera on either A's updated system or B's system with older host application software.

Example 2: Assume that A has firmware version 1.00, interface 0x0101, and B has firmware version 1.08, interface 0x0202. B cannot use A's PC unless A upgrades her software to recognize the new interface 0x0202. If B's PC uses the camera API including all revisions shown in Table 1, then B's PC can be used with either A's camera or B's camera.

Example 3: If user A has firmware version 1.0 and uses CAMAPI #400 as shown in Table 1, and user B has firmware version 3.0 and uses CAMAPI #420, as shown in Table 2, then a PC must have both versions of software that interface with the separate interfaces to the cameras in order to access both cameras.

In one embodiment, the interfaces have unique interface identifiers. One example of an interface is the TWAIN interface, which describes to an imaging application how to go about acquiring images from a scanner or other digital imaging devices. The current version of TWAIN is 1.7. TWAIN is maintained by a standards group made up of several industry participants. More information on TWAIN is available through http://www.twain.org. Proprietary interfaces may also be used. For example, DLLs supporting a particular application program so that the application program has the ability to transfer and delete images from the imaging device may be supported.

The hardware identifier specifies hardware changes, for example, a stepper motor may be added to the imaging device. Firmware releases may be set up to track minor and major changes. For example, a minor change may be a bug fix or enhancement. A major change may be the addition of new hardware.

Figure 10:
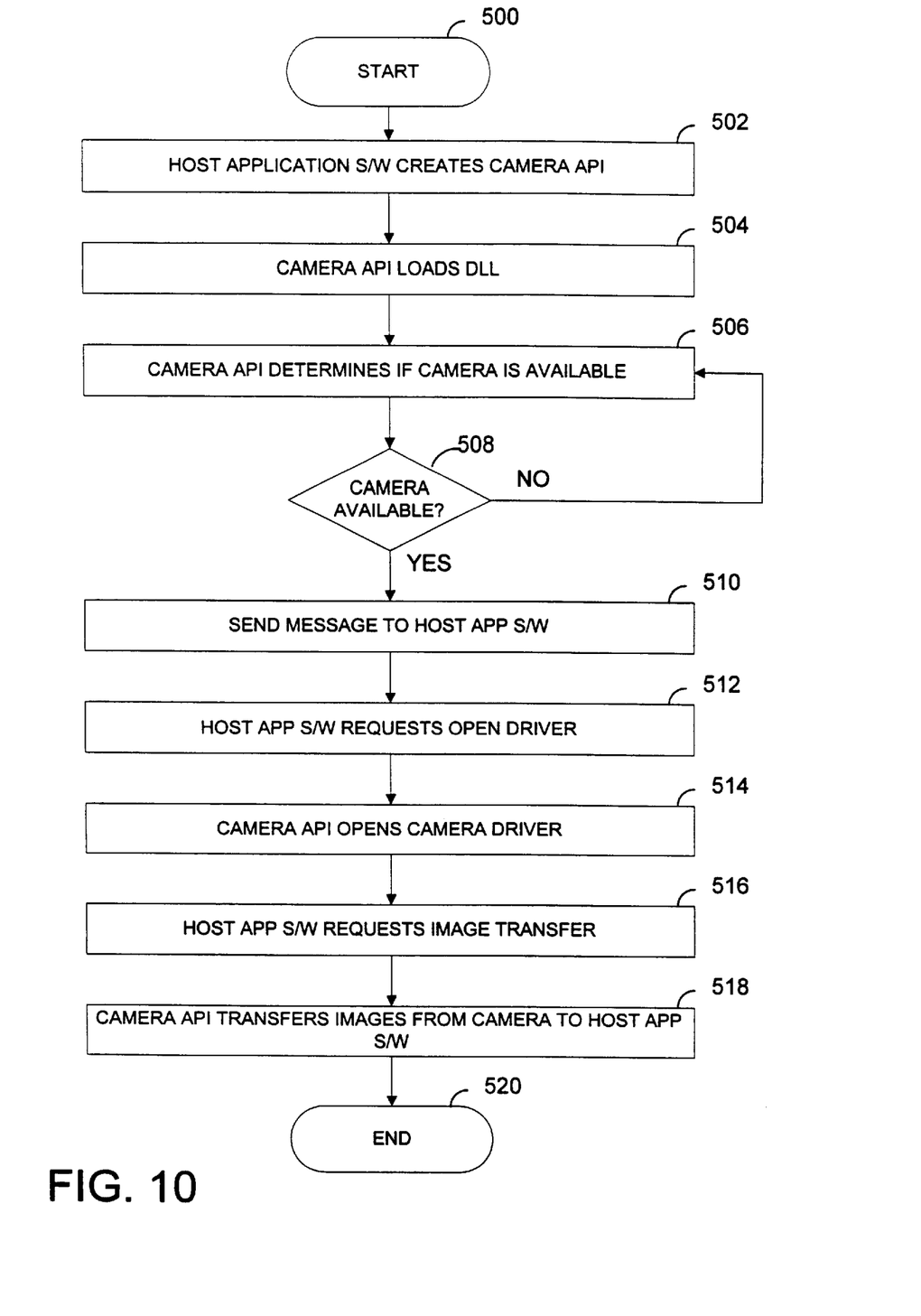
FIG. 10 shows a flowchart of one embodiment of the process of initializing the host application software to establish a communication with a camera.

FIG. 10 shows a flowchart of one embodiment of the process of initializing the host application software to establish a communication with an imaging device. In this disclosed embodiment, the imaging device is a camera, and the host system is a personal computer. The flowchart begins at block 500. The process continues at block 502, at which the host application software creates a camera API. The camera API loads a DLL that may be operating system dependent at block 504. At block 506, the camera API determines if a camera is available.

At block 508, if a camera is not available, then the flowchart returns to block 506. However, if a camera is available, the process continues at block 510. At block 510, the camera API sends a message to the host application software indicating that a camera is available. The host application software requests that the camera driver be open at block 512. The camera API responds by opening the camera driver, as shown at block 514. The process of opening a driver means establishing a connection between the camera API and the camera driver. The firmware update process, as previously described, occurs at this point.

At block 516, the host application software requests that images are transferred from the camera to the host system. The camera API responds by transferring image information from the camera to the host application software at block 518. Image information may include image pixel data as well as other information, such as color palette information, compression information, orientation of the image, and so forth. The flowchart terminates at block 520.

Figure 11:
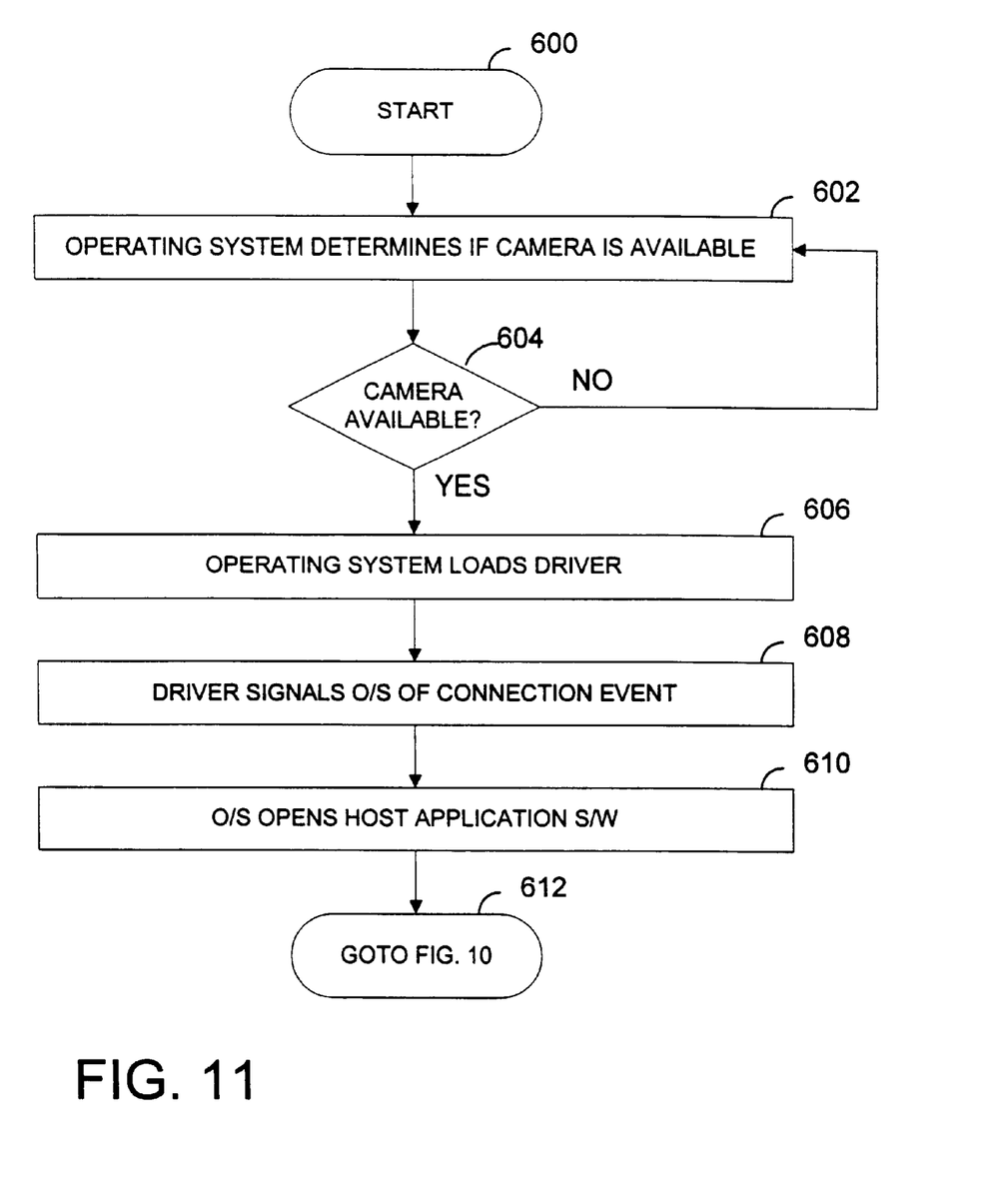
FIG. 11 shows a flowchart of one embodiment of the process of detecting that an imaging device such as a camera is attached to a host system.

FIG. 11 shows a flowchart of one embodiment of the process of detecting that an imaging device such as a camera is attached to a host system. The flowchart starts at block 600. It continues at block 602, in which the operating system determines if a camera is available. This may be done with the aid of a port driver such as a USB driver. If the camera is not available, the process returns to block 602. If a camera is available at block 604, the process continues at block 606 at which the operating system loads the camera driver.

In one embodiment, an operating system such as Windows 98 is used by the host system. Windows 98 allows the driver to signal the operating system of the camera being connected to the host system (the connection event), as shown by block 608. The operating system then opens the applications that are registered with the connection event. In this case, the host application software for the camera is initiated, as shown at block 610. The flowchart then continues with the flowchart of FIG. 10.

If the operating system does not provide a way of opening an application based on the connection event, an alternate embodiment may use a "service" instead of the steps shown by blocks 608 and 610. The service is installed by the user and is initiated on the host system automatically when the host system boots up. The service opens the host application software when a camera is detected. In one embodiment, the service uses the camera API to determine if the camera is available. Thus, the service acts as a mini-host application in a manner similar to that shown in FIG. 10. However, the service initiates the host application software when a connection to the camera driver is established. The host application then establishes its own connection to the camera driver to transfer images from the camera.

In one embodiment, the host application software 60 and the camera driver 44 are shipped with the camera 10. The host application software 60 and camera driver 44 may be shipped via floppy disk or CD-ROM. Alternatively, the host application software 60 and camera driver 44 can be downloaded via the World Wide Web. The host application software 60 and camera driver 44 are installed to a storage medium on the host system, such as a hard disk, dynamic random access memory (DRAM), static random access memory (SRAM), or flash memory.

In the foregoing specification, the invention has been described with reference to specific exemplary embodiments thereof It will, however be evident to someone having the benefit of this disclosure, that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of updating firmware on an imaging device, the method comprising:

upon establishing a connection between the imaging device and a host system, automatically detecting if a firmware version on the imaging device matches a firmware version on the host system;

if the firmware version on the imaging device does not match, updating the firmware on the imaging device automatically with firmware located on the host system, and executing the updated firmware; and if the firmware version on the imaging device matches, executing the firmware on the imaging device.

2. The method of claim 1, wherein the step of detecting further comprises:

receiving device interface information from the imaging device; and comparing the device interface information with interface information stored on the host system.

3. The method of claim 1, wherein the step of updating further comprises:

loading the firmware from the host system to a buffer memory on the imaging device;

checking for errors in the loaded firmware; and refreshing the firmware on the imaging device with the loaded firmware if the loaded firmware is error free.

4. The method of claim 3, wherein the step of updating is repeated if the loaded firmware is not error free.

5. The method of claim 1, wherein the step of updating is performed if the firmware version on the imaging device is an earlier version of the firmware than the firmware version on the host system.

6. The method of claim 1 further comprising:

loading at least one configuration table into the imaging device from the host system.

7. The method of claim 6, wherein the at least one configuration table are used to manipulate imaging data on the imaging device.

8. The method of claim 1 wherein the step of executing the updated firmware is performed by initiating a reset to the beginning of a bootloader.

9. A system comprising:

a processor;

a storage medium storing instructions which when executed by the processor cause the processor to:

detect if a connection is established between an imaging device and a configuration system;

if a connection is established, detect if a firmware version on the imaging device matches a firmware version on the configuration system;

if the firmware version on the imaging device does not match, update the firmware on the imaging device automatically with firmware from the configuration system, and execute the updated firmware; and if the firmware version on the imaging device matches, execute the firmware on the imaging device.

10. The system of claim 9, wherein the step of detecting comprises:

receiving device interface information from the imaging device; and comparing the device interface information with interface information stored on the configuration system.

11. The system of claim 9, wherein the step of updating further comprises:

loading at least one configuration table into the imaging device from the configuration system.

12. The system of claim 11, wherein the at lest one configuration table are used to manipulate imaging data on the imaging device.

13. A computer-readable medium containing executable instructions which, when executed in a processing system, causes the processing system to update the firmware on an imaging device by:

detecting if a connection is established between an imaging device and a host system;

if a connection is established, detecting if a firmware version on the imaging device matches a firmware version on the host system;

if the firmware version on the imaging device does not match, updating the firmware on the imaging device automatically with firmware from the host system, and executing the updated firmware; and if the firmware version on the imaging device matches, executing the firmware on the imaging device.

14. The medium of claim 13, wherein detecting if a firmware version on an imaging device matches a firmware version on a host system further comprises:

receiving device interface information from the imaging device; and compating the devine interface information with interface information stored on the host system.

15. The medium of claim 13 further comprising:

loading at least one configuration table into the imaging device from the host system.

16. The medium of claim 15, wherein the at least one configuration table are used to manipulate imaging data on the imaging device.

17. The medium of claim 13, wherein the step of updating further comprises:

loading the firmware from the host system to a buffer memory on the imaging device;

checking for errors in the loaded firmware in the buffer memory; and refreshing the firmware on the imaging device with the loaded firmware in the buffer memory if the loaded firmware is error free.

18. The medium of claim 17, wherein the step of updating is performed if the firmware version on the imaging device is an earlier version of the firmware than the firmware version on the host system.

19. A method of updating firmware on a camera, the method comprising:

connecting the camera to a host system;

detecting if a firmware version on the camera matches a firmware version on the host system;

if the firmware version on the camera does not match, updating the firmware on the camera automatically with firmware from the host system, and executing the updated firmware; and if the firmware version on the camera matches, executing the firmware on the camera.

20. The method of claim 19, wherein the step of detecting further comprises:

receiving device interface information from the camera; and comparing the device interface information with interface information stored on the host system.

21. The method of claim 19 further comprising:
  loading at least one configuration table into the camera from the host system.

22. The method of claim 21, wherein the at least one configuration table are used to manipulate imaging data on the imaging device.

23. A system for updating firmware on an imaging device comprising:
  means for detecting if a firmware version on the imaging device matches a firmware version on a host system;
  if the firmware version on the imaging device does not match,
    means for updating the firmware on the imaging device automatically with firmware from the host system, and
    means for executing the updated firmware; and if the firmware version on the imaging device matches,
    means for executing the firmware on the imaging device.

24. A method of updating firmware on an imaging device, the method comprising:
  sending a firmware version on the imaging device to a host system in response to a request from the host system;
  if the host system transfers firmware to the imaging device,
    updating the firmware on the imaging device automatically with the firmware from the host system, and
    executing the updated firmware; and
  if the host system does not transfer firmware,
    executing the firmware on the imaging device.

25. The method of claim 24, wherein the step of updating further comprises:
  loading the firmware from the host system to a buffer memory; checking for errors in the loaded firmware; and
  refreshing the firmware with the loaded firmware if the loaded firmware is error free.

26. The method of claim 25, wherein the step of updating is repeated if the loaded firmware is not error free.

27. The method of claim 24 further comprising:
  loading at least one configuration table into the imaging device from the host system.

28. The method of claim 27 wherein the at lest one configuration table are used to manipulate imaging data on the imaging device.

29. A system for updating firmware on an imaging device comprising:
  means for sending a firmware version on the imaging device to a host system in response to a request from the host system;
  if the host system transfers firmware to the imaging device,
    means for updating the firmware on the imaging device automatically with the firmware from the host system, and
    means for executing the updated firmware; and
  if the host system does not transfer firmware, means for executing the firmware on the imaging device.

30. A system for updating firmware on an imaging device comprising:
  a firmware version on the imaging device; and
  updating logic within a host system configured to update the firmware on the imaging device automatically with firmware from a host system if the firmware version on the imaging device does not match a firmware version on the host system.

31. The system of claim 30 further comprising:
  a buffer memory on the imaging device for receiving firmware from the host system; and
  a bootloader on the imaging device configured to check for errors in the firmware received by the buffer memory from the host system.

32. The system of claim 31 wherein the updating logic automatically updates the firmware on the imaging device upon establishing a connection between the imaging device and the host system.

* * * * *

UNITED STATES PATENT AND TRADEMARK OFFICE
CERTIFICATE OF CORRECTION

PATENT NO. : 6,360,362 B1  
DATED : March 19, 2002  
INVENTOR(S) : Fichtner et al.

It is certified that error appears in the above-identified patent and that said Letters Patent is hereby corrected as shown below:

Column 2,
Line 36, after "multiple", delete "a".

Signed and Sealed this

Seventeenth Day of September, 2002

Attest:

JAMES E. ROGAN  
Attesting Officer  Director of the United States Patent and Trademark Office